United States Patent Office

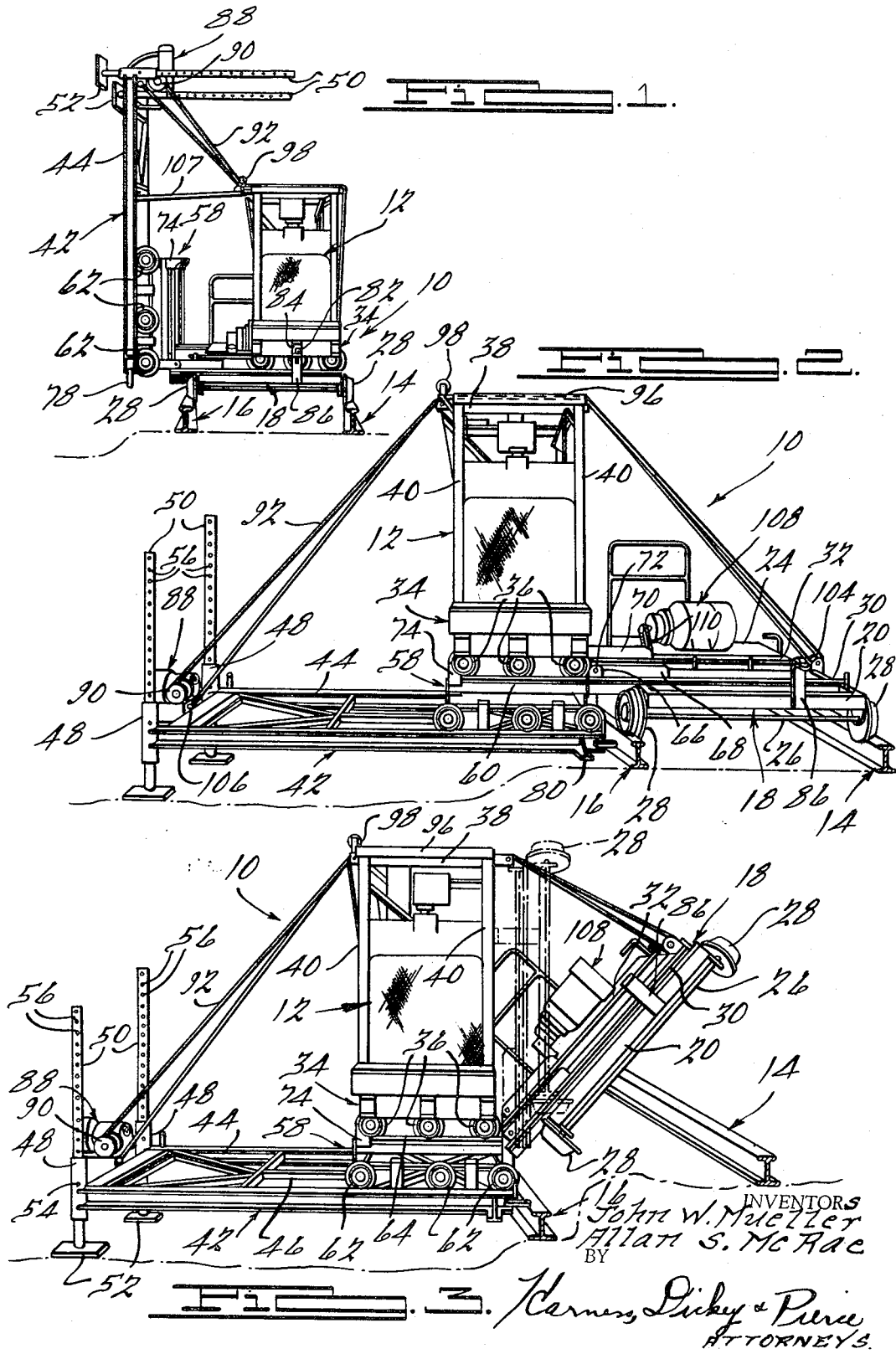

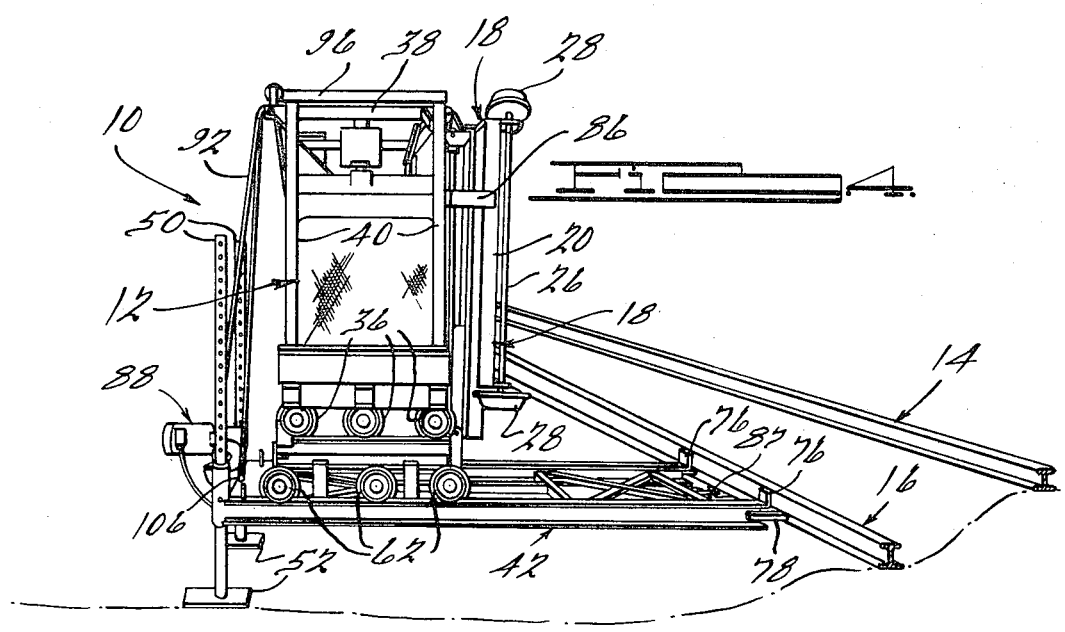
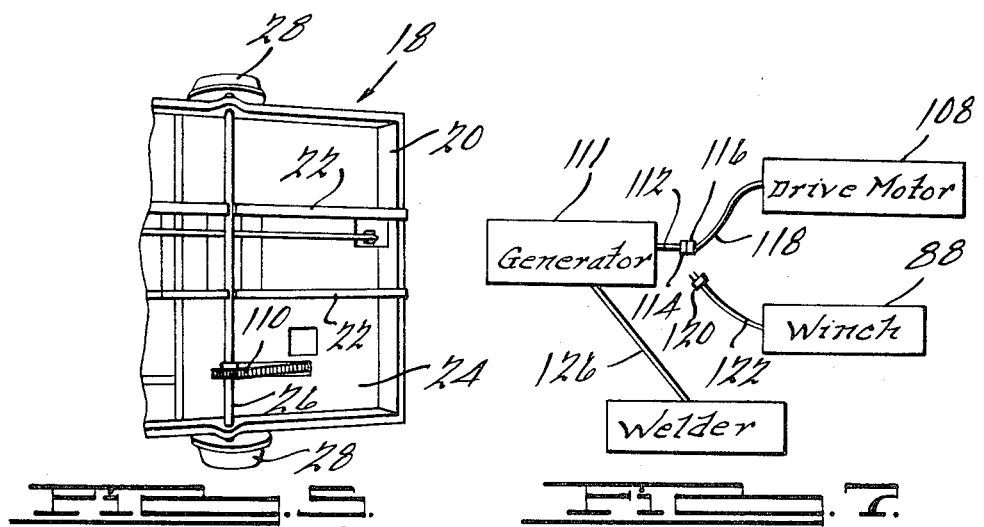
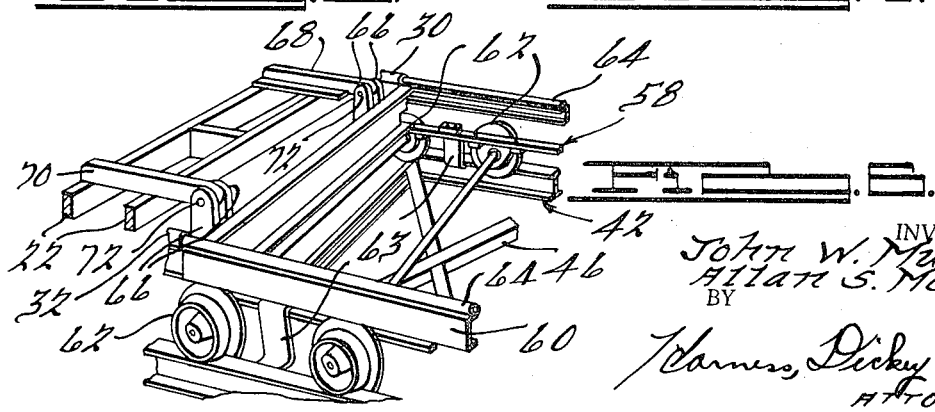

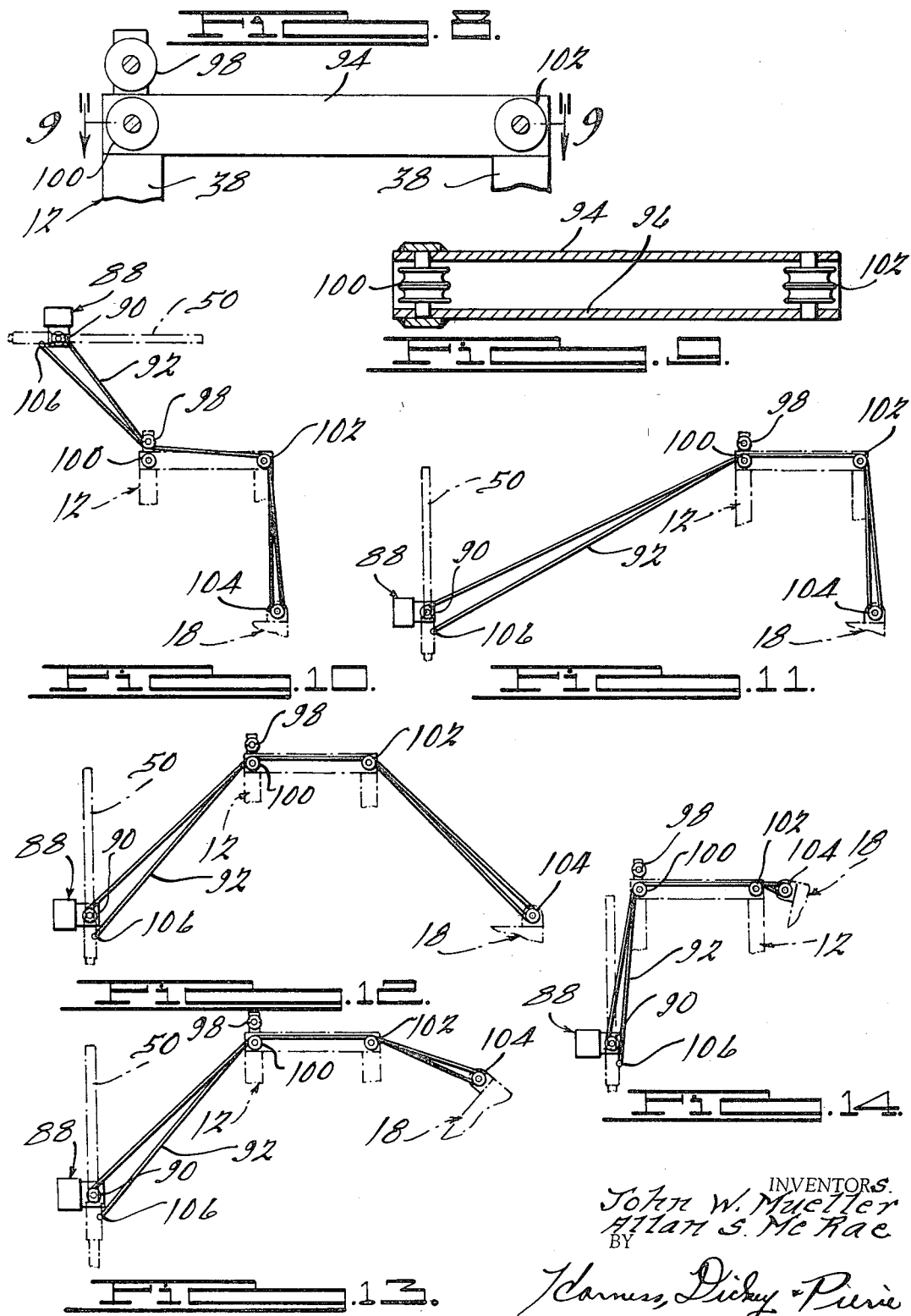

3,412,691
Patented Nov. 26, 1968

3,412,691
WELDING TRANSPORTER
John W. Mueller, Jackson, and Allan S. McRae, Dearborn, Mich., assignors to The New York Central Railroad Company, New York, N.Y., a corporation of Delaware
Filed July 20, 1966, Ser. No. 566,536
14 Claims. (Cl. 105—177)

ABSTRACT OF THE DISCLOSURE

A device for conveying portable apparatus and the like from place to place along a railroad right-of-way and comprising a pair of pivotably connected frames; wheels on one of the frames whereby the same may be movably supported on spaced rails; means carried by the other of the frames whereby the latter may be supported in a position laterally adjacent the rails and when in said position support said wheeled frame, and means for varying the angular relation between the frames including cable winding and unwinding means and cable means extending between the frames and operatively connected to the cable winding and unwinding means, whereby actuation of the cable winding and unwinding means effects pivotal movement of the one of the frames relative to the other of the frames.

---

This invention relates generally to transportation apparatus and, more particularly, to a new and improved apparatus for transporting welding equipment and the like along a railroad right-of-way and for quickly and safely setting the equipment off the railroad track as, for example, when the right-of-way is required to permit passage of a train.

The ever increasing need for portable sources of electric and motive power along railroad right-of-ways has prompted the development of a great variety of different types of vehicles which have been adapted to transport, for example, internal combustion engines, along railroad tracks. In particular, a great number of vehicles have been developed for transporting internal combustion engine driven arc welding generators and the like, to facilitate transporting such welding generators along railroad tracks for use in welding rail ends, frogs, crossovers and the like. Similarly, vehicles have been developed for transporting internal combustion engine driven air compressors for cleaning track ballast, tamping ties and various other work in which compressed air is employed.

One problem that virtually all types of railroad vehicles of the above character have encountered is the difficulty of expeditiously removing the equipment from the railroad track in the event the track right-of-way is required, and thereafter placing the equipment back on the track so that it may be transported from place to place therealong. Although great number of ingenious mechanisms have heretofore been proposed to permit portable power equipment to be set off from a railroad track to clear the track right-of-way, none of these arrangements have been acceptable from a commercial and practical standpoint since they have required excessive time to effect complete removal of the power equipment from the tracks, and they have frequently required three, four or more workmen to move the equipment. Accordingly, such heretofore known and used set-off apparatus have not satisfied the basic requirements that the power equipment be easily removed from the track by not more than two, and preferably by only a single person, and that the apparatus should be able to set the equipment off from a railroad track and thereafter place the equipment back onto the track in a minimum amount of time, the importance of speed being obvious when it is appreciated that trains normally operate along railroad tracks in accordance with a rather strict time schedule.

It is accordingly a primary object of the present invention to provide a new and improved apparatus for transporting welding or similar type equipment along and moving such equipment to and from a railroad track.

It is another object of the present invention to provide a new and improved apparatus of the above character that permits removal of the welding or similar type equipment in a simple and efficient manner which may be accomplished by a single person.

It is still another object of the present invention to provide a new and improved apparatus of the above character which enables the welding or similar type equipment to be set off from a railroad track at virtually any location therealong.

It is another object of the present invention to provide a new and improved apparatus of the above character which permits removing the welding or similar type equipment from a railroad track in a minimum amount of time.

It is a further object of the present invention to provide a new and improved apparatus of the above character which is self-powered and self-propelled.

It is yet another object of the present invention to provide a new and improved apparatus of the above character which includes a set-off structure and a carriage adapted to be manipulated to and from positions adjacent the track by means of a novel winch and cable arrangement.

It is still a further object of the present invention to provide a new and improved apparatus of the above character which includes locking means for detachably securing the set-off structure and carriage, thereby enabling the apparatus to be safely conveyed at relatively high speeds along a railroad track.

Other objects and advantages of the present invention will become apparent from the following detailed description, taken in conjunction with the accompanying drawings, wherein:

FIGURE 1 is an end elevational view of an exemplary embodiment of the present invention;

FIGURE 2 is an end elevational view of the apparatus illustrated in FIGURE 1 showing the set-off structure thereof disposed in a lowered position;

FIGURE 3 is an end elevational view of the structure illustrated in FIGURE 1 with the transporter carriage thereof disposed in a partially elevated position;

FIGURE 4 is an end elevational view of the structure illustrated in FIGURE 1 when disposed in a position completely offset from the associated railroad track;

FIGURE 5 is a bottom perspective view of the carriage transporter of the present invention illustrating an exemplary method of driving the carriage wheels thereof;

FIGURE 6 is an elevated perspective view of a portion of the take-off structure of the apparatus embodying the present invention;

FIGURE 7 is a schematic representation of the electrical system of the apparatus of the present invention;

FIGURE 8 is an enlarged side elevational view of a portion of the cable support means embodied in the present invention;

FIGURE 9 is a top elevational view of the structure illustrated in FIGURE 8; and FIGURES 10 through 14 are schematic representations of the configurations which the cable system of the present invention assumes during an exemplary operational cycle thereof.

Generally speaking, the apparatus of the present invention comprises a transporter carriage provided with suitable wheels that are adapted to run along a railroad track, and a take-off structure which is adapted to be disposed alongside of the railroad track at a point where it is desired to set off the equipment supported upon and carried by the transporter carriage. Shelf-contained guide rail or track means is provided on the carriage and set-off structure to enable the equipment to be conveyed from the carriage onto the set-off structure after the structure has been positioned laterally adjacent the railroad tracks and preparatory to biasing the carriage off from the tracks to clear the right-of-way therealong.

Referring now in detail to the drawings and more particularly to FIGURES 1 through 4, a transporter apparatus 10, in accordance with an exemplary embodiment of the present invention, is designed primarily to carry heavy pieces of machinery such as an internal combustion engine powered electric arc welder unit, generally designated by the numeral 12, along and over the main spaced rails 14 and 16 of a railroad right-of-way. As best seen in FIGURES 2 and 3, the apparatus 10 includes a transporter carriage, generally designated 18, which comprises a generally rectangular-shaped frame construction 20, a pair of longitudinally extending reinforcing members 22 and a support platform 24 mounted on the upper surface of the frame 20 and members 22. A pair of transversely extending axles 26 are mounted on and extend through the longitudinal sides of the frame member 20 and support spaced pairs of wheels 28 which run upon the rails 14, 16 and thereby enable the apparatus 10 to move along said rails.

Extending transversely of the top of the transporter carriage 18 is a pair of spaced parallel guide rails 30 and 32 (see FIGURE 2) upon which is mounted a wheeled dolly assembly, generally designated 34, having a plurality of wheels 36 at the longitudinal ends thereof adapted to ride upon the guide rails 30 and 32. The assembly 34 is adapted to have the welder unit 12 or the like fixedly mounted to the upper side thereof, as by any suitable means, whereby the unit 12 is transversely movable along the rails 30, 32 with the assembly 34. A generally rectangular shaped frame structure 38 is disposed directly above the welder unit 12 and is supported upon a plurality of vertically extending corner members, generally designated 40.

As best seen in FIGURES 1 through 3, a set-off structure 42 is shown as comprising a generally rectangular-shaped frame 44 having a plurality of internal support or reinforcing members 46, the members 46 along with the frame 44 being of any convenient structural shape to assure that the structure 42 is sufficiently rigid to support the welder unit 12 or the like when the same is disposed thereon. Secured to the outer end of the set-off structure 42 is a pair of vertically extending tubular members 48. A pair of elongated adjustable support members 50 are slidably mounted one within each the members 48 and are provided with foot plates 52 to prevent the lower ends thereof from sinking into the ground or roadbed when the same are called upon to support the outer end of the structure 42. The manner in which the support members 50 are adjustably mounted in the members 48 is most clearly illustrated in FIGURES 2 and 3 of the drawings. As there shown, the members 48 are each provided with a pair of diametrically aligned apertures 54, while each of the support members 50 is provided with a plurality of apertures 56 which are spaced vertically along the entire lengths thereof. The members 50 are adapted to slide vertically within the members 48 until the apertures 54 register with one of the apertures 56, at which time suitable pins (not shown) may be inserted through the aligned apertures 54, 56 for securing the support members 50 in fixed relation with respect to the members 48. By virtue of the fact that the support members 50 are independently adjustable with respect to the set-off structure 42, the structure 42 may be placed in a substantially horizontal configuration regardless of the configuration of the terrain or roadbed directly therebelow.

Slidably carried on the set-off structure 42 is a wheeled dolly assembly, generally designated 58, which comprises a generally rectangular-shaped frame structure 60 having a plurality of guide wheels, generally designated 62, rotatably supported on the lower side thereof. The wheels 62 are provided with peripheral flanges and are thereby adapted to roll along the longitudinally spaced sides of the set-off structure frame 44. Preferably, at least a pair of retaining flanges 63 (see FIGURE 6) are fixedly secured to the dolly assembly 58 and slidably engage the set-off structure 42, whereby to secure the assembly 58 to the structure 42 when the latter is disposed in the position illustrated in FIGURE 1. As best shown in FIGURE 6, a pair of guide rails 64 are mounted on the top of the dolly assembly 54 and spaced longitudinally apart the same distance as the above described guide rails 30 and 32. The rails 64 are adapted to be longitudinally aligned with the rails 30, 32 when the structure 42 is in a lowered position, whereby to enable the dolly assembly 34 to roll from the rails 30, 32 onto the structure 42, in a manner hereinafter to be described.

The frame 60 of the dolly assembly 58 is provided with two pair of upwardly extending pivot tabs, generally designated 66, which, as best illustrated in FIGURE 6, are spaced longitudinally apart and adapted to have a pair of pivot links 68 and 70 pivotally connected therebetween by suitable pivot pins or the like 72. The links 68 and 70 are rigidly secured, as by welding or the like, to the top of the transporter carriage 18, whereby the carriage 18 is pivotably connected along a horizontally extending axis extending through the pins 72 to the dolly assembly 58. Accordingly, the carriage 18 is adapted to be pivoted relative to the dolly assembly 58 from the position illustrated in FIGURE 2 to the solid line position illustrated in FIGURE 3, and further to the phantom position illustrated in FIGURE 3.

Mounted on the opposite ends of the guide rails 64 from the pivot tabs 66 is a pair of stop plates 74 which are adapted to have the two outboard wheels 36 on the dolly assembly 34 abut thereagainst to limit transverse rolling movement of the assembly 34 upon the guide rails 64. In a similar manner, suitable stop plates 76 (see FIGURE 4) are provided on the ends of the longitudinally spaced sides of the frame 44 to limit movement of the dolly 58 toward the railroad rail 16.

The ends of the longitudinally spaced side members of the frame 44 which are adjacent the rail 16 when the set-off structure 42 is disposed in the position illustrated in FIGURES 2, 3 and 4 are provided with projections 78 which bear upon the "foot" of the rail 16 and thereby support the end of the structure 42 upon the rail 16. A pair of longitudinally extending support plates 80 (see FIGURE 2) are also provided on the lower sides of the longitudinally spaced members of the set-off structure 42, which plates 80 are adapted to bear upon the upper sides of the railroad ties subjacent the rails 14 and 16 to further provide support for the set-off structure 42 when the same is disposed in its lowered position.

In operation, the welder unit 12 is adapted to be transported along the rails 14 and 16 from one point to another and during such transport normally assumes the position illustrated in FIGURE 1. The wheeled dolly assembly 34 is also disposed in the position illustrated in FIGURE 1, during such transport, as is the set-off structure 42 and the dolly assembly 58. The dolly assembly 34 is releasably secured in said position by means of a locking pin or the like 82 (see FIGURE 1) which extends through suitable aligned apertures formed in a pair of locking tabs 84 and 86 welded or similarly secured to the side of the dolly 34 and to the end of the carriage 18, respectively. Means that will hereinafter be described is provided to maintain the take-off structure 42 in the substantially vertical configuration shown in FIGURE 1. Assuming that it is desired to clear the right-of-way on the rails 14, 16, either for the purpose of permitting a train to pass or to temporarily position the welder unit 12 adjacent the rails 14, 16 at a preselected temporary work station, the set-off structure 42 is moved from the substantially vertical position which it assumes in FIGURE 1 to the substantially horizontal position illustrated in FIGURE 2. Movement of the structure 42 will automatically effect engagement of the projections 78 with the rail 16. Preferably, some type of means is provided for lockingly, yet releasably, securing the set-off structure 42 to the rail 16 when said structure is disposed in a horizontal position. By way of example and as best seen in FIGURE 4, a suitable binder chain 87 is connected to the end of the structure 42 adjacent the rail 16, which chain is provided with a rail engaging hook (not shown) adapted to be inserted under the rail 16 and secured to the inboard side of foot portion thereof. Suitable chain tensioning means (not shown) is also provided to assure that the projections 78 and rail engaging hook firmly engage the rail 16, whereby to prevent any movement of the set-off structure 42 relative thereto during such time as the structure 42 is disposed in the horizontal position. With the set-off structure 42 disposed in the position illustrated in FIGURE 2, the adjustable support members 50 may be vertically adjusted within the members 48 until the structure 42 is firmly supported upon the ground or roadbed in as near a horizontal configuration as possible. More preferably, the support members 50 are adjusted so that the set-off structure 42 slopes slightly away from the rail 16 so as to facilitate movement of the dolly assembly 58 from the position illustrated in FIGURES 2 and 3 to the position illustrated in FIGURE 4.

After the set-off structure 42 has been properly positioned, as illustrated in FIGURE 2, the guide rails 64 are longitudinally aligned with the rails 30, 32 so that after the locking pin 82 is removed, the welder unit 12 may be rolled upon the dolly 34 from the position illustrated in FIGURE 1 to the position illustrated in FIGURE 2. It will be seen that the dolly assembly 34, when disposed in the position shown in FIGURE 2, rests directly upon the top of the dolly assembly 58. Suitable means such as another locking pin (not shown) may be used for fixedly securing the dolly assembly 34 upon the assembly 58, whereby to prevent any relative movement between the assemblies 34 and 58. With the welder unit 12 in said position on the dolly assembly 58, the transporter carriage 18 may be pivoted upwardly about the horizontal axis extending through the pivot pins 72 from the position illustrated in FIGURE 2 where the carriage 18 rides upon the rails 14, 16, to the solid line position in FIGURE 3 and eventually to the phantom position illustrated in FIGURE 3. Means which will later be described is provided for maintaining the transporter carriage 18 in the vertical phantom position shown in FIGURE 3.

With the transporter carriage 18 disposed in its vertical position, the entire module comprising the welder unit 12, transporter carriage 18, and dolly assemblies 34 and 58 may be moved to the left in FIGURE 3 along the longitudinally spaced sides of the set-off structure 42. The apparatus 10 will then assume the position illustrated in FIGURE 4, thereby clearing the right-of-way on the rails 14 and 16 to permit passage of a train or the like.

Referring now to the means utilized for pivoting the set-off structure 42 and transporter carriage 18 to and from their respective vertical and horizontal positions, and the means for rolling the dolly assembly 58 from the position illustrated in FIGURE 2 to the position illustrated in FIGURE 4, there is provided a cable system and an associated cable take-up winch assembly which, upon energization, is adapted to effect the desired movement of the carriage 18, set-off structure 42 and dolly assembly 58. More particularly and as best illustrated in FIGURE 2, a reversible, electrically energized winch assembly, generally designated 88, is mounted on the outboard end of the set-off structure 42. The assembly 88 comprises a drive sheave 90 which, upon proper energization of the assembly 88, rotates in a manner so as to reel or unreel one end of a single length of cable 92 that has one end thereof fixedly secured to the sheave 90 and the opposite end thereof fixedly secured to the set-off structure 42 directly below the winch assembly 88.

As best seen in FIGURES 2, 8 and 9, a pair of spaced parallel pulley support members 94 and 96 extend transversely across the top of the frame structure 38 and are rigidly secured thereto, as by welding or the like. Mounted interjacent the members 94 and 96 at the ends thereof adjacent the set-off structure 42 is a pair of vertically spaced pulleys 98 and 100, each of which is of the double sheave type, as illustrated. Another pulley 102 is mounted interjacent the members 94 and 96 at the opposite ends of these members from the pulleys 98, 100, which pulley 102 is also of the double sheave type. Still another pulley 104 is rotatably mounted on the side of the frame 20 of the transporter carriage 18 on the opposite side from the set-off structure 42. As best illustrated in the schematic diagrams of FIGURES 10 through 14, the cable 92 extends from the drive sheave 90 of the winch assembly 88 between the pulleys 98 and 100, over the pulley 102 and around the pulley 104. From the pulley 104, the cable 92 extends back over the second sheave of the pulley 104, interjacent the pulleys 98 and 100 and is fixedly secured to the take-off structure 42, as indicated at 106 in FIGURE 2.

Referring now to the operation of the transporter apparatus 10 of the present invention with particular reference to the schematic diagrams shown in FIGURES 10 through 14, the welder unit 12 is normally transported along the rails 14, 16 with the set-off structure 42 disposed in the vertical position illustrated in FIGURE 1. During such normal transport, the wheel dolly assembly 34 is disposed in the position illustrated in FIGURE 1, as is the dolly assembly 58. The cable 92 is disposed in the configuration shown in FIGURE 10 during such normal transport. When it is desired to clear the right-of-way on the rails 14, 16, the winch assembly 88 is initially energized in a manner such that the drive sheave 90 unreels the cable 92, resulting in the set-off structure 42 moving, under the influence of gravity, from the position illustrated in FIGURE 1 to the position illustrated in FIGURES 2 through 4. As this occurs, the cable 92 moves from the configuration illustrated in FIGURE 10 to the configuration illustrated in FIGURE 11. The support members 50 are then vertically adjusted within the members 48, as hereinabove described. After the set-off structure 42 has been properly positioned, the welder unit 12 is rolled along the aligned guide rails 30, 32 and 64 upon the dolly 34 from the position illustrated in FIGURE 1 to the position illustrated in FIGURE 2. As the unit 12 thus moves to the position in FIGURE 2, the cable 92 assumes the configuration shown in FIGURE 12. With the welder unit 12 resting on the top of the assembly 58, the winch 88 is energized in a manner such that the drive sheave 90 reels in the cable 92, whereby the transporter carriage 18 will be pivoted upwardly from the position illustrated in FIGURE 2 to the position illustrated in FIGURES 3 and 13 and eventually to the phantom position shown in FIGURE 3. By virtue of the tension on the cable 92 applied by the winch 88, the transporter carriage 18 will be maintained in the vertical phantom position shown in FIGURE 3. Continued energization of the winch 88 results in further reeling in of the cable 92, with the further result that the entire module comprising the welder unit 12, transporter carriage 18, and dolly assemblies 34 and 58 will move toward the winch assembly 88 or, from the position illustrated in FIGURE 3 to the position illustrated in FIGURE 4. With the apparatus disposed in the position illustrated in FIGURE 4, the cable 92 is in the configuration shown in FIGURE 14, and the right-of-way on the rails 14 and 16 will be cleared to permit passage of a train or the like.

At such time it is desired to place the apparatus 10 back on to the rails 14, 16 to permit transport thereof to another location along the railroad right-of-way, the winch 88 is energized so as to unreel the cable 92, at which time the welder unit 12, transporter carriage 18, and dolly assemblies 34 and 58 may be moved from the position illustrated in FIGURE 4 to the position illustrated in FIGURE 3. The winch assembly 88 may be then energized to further unreel the cable 92, resulting in the transporter carriage 18 pivoting downwardly from the phantom position illustrated in FIGURE 3 to the solid line position illustrated in this figure, and eventually to the position illustrated in FIGURE 2. The welder unit 12 may be then rolled upon the dolly assembly 34 onto the guide rails 30 and 32, and after the dolly assembly 34 has moved to the position illustrated in FIGURE 1, the locking pin 82 may be attached to fixedly secure the dolly assembly 34 to the transporter carriage 18. Thereafter, the winch assembly 88 may be energized to reel in the cable 92, resulting in the set-off structure 42 being biased upwardly from the position illustrated in FIGURE 2 to the vertical position illustrated in FIGURE 1. A suitable retaining or locking bar, illustrated in FIGURE 1 and designated by the numeral 107, may be used to lockingly secure the set-off structure 42 in the vertical position during transport of the apparatus 10 along the railroad right-of-way so that tension need not be maintained on the cable 92.

In accordance with the principles of the present invention, the transporter apparatus 10 is adapted to be self-propelled so as to be able to travel from point to point along the railway right-of-way. Motive power providing for such self-propulsion is achieved through the provision of an electric motor, generally designated 108, which is mounted on the platform 24 of the transporter carriage 18. As best seen in FIGURES 2 and 5, the motor 108 is connected through a drive chain or the like 110 with the axle 26 so that upon energization of the motor 108, the axle 26 and hence the wheels 28 will rotate, resulting in the apparatus 10 being moved along the rails 14, 16. The motor 108 is preferably of the reversible type so that the apparatus 10 can be made to move in either direction along the railway right-of-way. A suitable clutching and or braking mechanism may be provided to control the speed of the apparatus 10 along the rails 14, 16 or, alternatively, a suitable electric power control means may be provided to vary the speed of the motor 108.

Referring now to FIGURE 7, the electric current supplied to the winch assembly 88 and drive motor 108 is adapted to be supplied through the generator section 111 of the welder unit 12 which, of course, supplies electric current to the arc welding section of the unit 12 in a manner well-known in the art. The generator 111 is in turn powered by a conventional internal combustion engine which may be either gasoline or diesel powered, as will be apparent. Although it is contemplated that any one of a variety of well-known types of electrical circuits may be used for selectively communicating electric current to the drive motor 108 and winch assembly 88, in the exemplary embodiment of the present invention illustrated herein, the generator 111 is merely provided with an electrical outlet conduit 112 having a receptacle 114 mounted on the end thereof. The receptacle 114 is adapted to be connected to an outlet plug 116 connected to the drive motor 108 through a conductor 118 or, to an outlet plug 120 connected to the winch assembly 88 through a conductor 122. That is, when the apparatus 10 is being transported along the railway right-of-way, the plug 116 is connected to the receptacle 114 so that electric current is normally supplied to the drive motor 108. At such time as it is desired to clear the railroad right-of-way, the plug 116 is disengaged from the receptacle 114 and the plug 120 is engaged therewith, resulting in electric current being supplied to the winch assembly 88 so that the assembly 88 may operate in the above described manner to effect raising and lowering of the set-off structure 42 and transporter carriage 18. In the schematic diagram illustrated in FIGURE 7, the arc welding section of the unit 12 is representatively connected to the generator section 111 by means of a suitable conductor 126. It will be apparent, of course, that at such time as it is again desired to transport the apparatus 10 along the rails 14, 16, the drive motor 108 is connected to the generator 111 by interchanging the plugs 120 and 116.

It will be seen from the foregoing description of the present invention that the transporter apparatus 10 provides a vehicle which is entirely self-propelled and thereby may be easily transported along a railroad right-of-way without the use of any auxiliary source of motive power. Moreover, it will be seen that the apparatus 10 may be easily removed from the railroad right-of-way by a single person through the provision of the cable and winch system hereinabove described. Also, the apparatus 10 may be taken off and set back upon a railroad right-of-way in a minimum period of time so as to not interfere with the time schedule of trains which may be traversing the same right-of-way. It will be noted, of course, that the apparatus 10 of the present invention is not limited in use to transporting arc welding equipment. For example, the apparatus 10 may be used for transporting internal combustion engine driven air compressor equipment, earth moving equipment and the like. Accordingly, the apparatus 10 of the present invention, together with being self-propelled, easy to move on to and off from railroad right-of-ways, is characterized by universality of application.

While it will be apparent that the exemplary embodiment of the transporter apparatus 10 of the present invention is well calculated to fulfill the above objects, it will be appreciated that the present invention is susceptible to modification, variation and change without departing from the proper scope or fair meaning of the subjoined claims.

What is claimed is:
1. In a device for conveying portable apparatus and the like from place to place along a railroad right-of-way,
   a pair of pivotably connected frames,
   wheels on one of said frames whereby the same may be movably supported on spaced rails,
   means carried by the other of said frames whereby the latter may be supported in a position laterally adjacent said rails and when in said position support said wheeled frame, and
   means for varying the angular relation between said frames including cable winding and unwinding means and cable means extending between said frames and operatively connected to said cable winding and unwinding means, whereby actuation of said cable winding and unwinding means effects pivotal movement of one of said frames relative to the other of said frames.
2. The invention as set forth in claim 1 which includes a substantially continuous trackway on said frames upon which the portable apparatus may be moved from one of said frames to the other.
3. The invention as set forth in claim 2 wherein said other frame includes means engageable with one of the spaced rails and means for support upon the roadbed of the railroad right-of-way, whereby to support said other frame in said position laterally adjacent said rails.
4. The invention as set forth in claim 1 which includes means for driving the device along a railroad track.
5. In a device for conveying portable apparatus and the like from place to place along a railroad track,
   a pair of pivotally connected frames,
   wheels on one of said frames whereby the same may be movably supported on spaced rails,
   means carried by the other of said frames whereby the latter may be supported in a position laterally adjacent said rails and when in said position support said wheeled frame, guide rail means extending transversely of said wheeled frame, a dolly assembly movably secured to said other frame and provided with guide rail means thereon in substantial alignment with said guide rail means on said wheeled frame, and means for varying the angular relation between said frames including winch means on one of said frames and cable means extending between and operatively connected to said frames, whereby actuation of said winch means effects pivotal movement of one of said frames relative to the other of said frames.

6. The invention as set forth in claim 5 wherein said winch means is mounted on said other frame.

7. The invention as set forth in claim 5 which includes pulley means on each of said frames for movably supporting said cable means, whereby movement of said cable means in one direction moves said other frame to said position laterally adjacent said rails eand movement of said cable means in the opposite direction moves said wheeled frame relative to the portable apparatus.

8. The invention as set forth in claim 5 which includes means for energizing said winch means and driving said wheeled frame.

9. In a transporter apparatus for removing a welder unit or the like having self-contained electrical power generating means from a railroad track to a position laterally adjacent the track, the combination which includes, a wheeled transporter carriage disposed to run on the said railroad track, a pair of spaced transversely extending guide rails on said carriage, a first dolly assembly supporting the welding unit and movable transversely along said guide rails, a set-off structure adapted to be supported in substantially horizontal position laterally adjacent the railroad track, a second dolly assembly transversely movable along said set-off structure, a pair of spaced transversely extending guide rails on second dolly assembly adapted for alignment with said guide rails on said carriage, whereby said welder unit may be biased from said carriage to said second dolly assembly upon said first dolly assembly, means pivotally connecting said set-off structure and said first dolly assembly, whereby said carriage may be biased between a substantially horizontal position and a substantially vertical position, cable means extending between said set-off structure and said carriage and winch means for winding and unwinding said cable means and thereby varying the angular relation between said take-off structure and the welder unit and between the welder unit and said carriage, and means for driving said transporter carriage whereby said apparatus is self-propelled.

10. The invention as set forth in claim 9 wherein said winch means includes circuit means communicable with the generating means.

11. The invention as set forth in claim 9 wherein said drive means comprises an electric motor and means for communicating motive power from said motor to the transporter carriage.

12. The invention as set forth in claim 11 which includes circuit means whereby said electric motor may be energized by the generator means.

13. The invention as set forth in claim 9 which includes pulley means mounted on said transporter carriage and said set-off structure for movably supporting said cable means.

14. The invention as set forth in claim 13 wherein said cable means comprises a single length cable having one end thereof secured to said set-off structure and the opposite end thereof secured to said winch means, whereby actuation of said winch means in one direction results in movement of said set-off structure from a substantially vertically position to a substantially horizontal position, and actuation of said winch means in the opposite direction results in movement of said transporter carriage away from the railroad track.

References Cited

UNITED STATES PATENTS

| 705,586   | 7/1902 | Hopkins    | 105—177 |
| 2,009,113 | 7/1935 | Landis et al. | 105—177 |
| 2,117,077 | 5/1938 | Bernard    | 105—177 |
| 2,158,352 | 5/1939 | Brown      | 105—177 |
| 3,182,604 | 5/1965 | Foxx et al. | 105—177 |

ARTHUR L. LA POINT, *Primary Examiner.*

H. BELTRAN, *Assistant Examiner.*